Aug. 19, 1958  H. A. QUIST  2,847,762
MAGNETIZED BOB OPERATED GAUGE HATCH
Filed April 1, 1957

INVENTOR.
HAROLD A. QUIST
BY Robert O. Spindle
ATTORNEY

United States Patent Office 2,847,762
Patented Aug. 19, 1958

2,847,762
MAGNETIZED BOB OPERATED GAUGE HATCH

Harold A. Quist, Swarthmore, Pa., assignor to Sun Oil Company, Philadelphia, Pa., a corporation of New Jersey Application April 1, 1957, Serial No. 650,034

4 Claims. (Cl. 33—126.5)

The present invention relates generally to gauging devices for liquid storage tanks and particularly to such devices designed to conserve volatile liquids subject to such gauging operations.

The principal object of the invention is to provide a gauging device which will be opened and closed by the act of gauging the liquid.

Another object is to provide a gauging device which remains closed to the escaping tendency of volatile hydrocarbons until the actual gauging operation takes place thus permitting deliberate preparations to prevent the incidental escape of volatile constituents.

Still another object of the invention is to provide a gauging device which although remaining closed at all times except when the gauge is actually taken, does not in any way interfere with a free and complete gauging operation.

And yet another object of the invention is to provide a gauging device which remains closed at all times except during the actual gauging operation, does not require the operation of any mechanism to open and close the gauge passage, but is completely responsive to the movement of the gauge elements.

In accordance with the present invention, a gauging device is disclosed which utilizes a gauging bob supporting a permanent magnet. The gauging bob passes through a gauging hatch to magnetically engage a closure element and remove it as the gauge is started. After the depth of liquid is measured, the gauging bob is withdrawn, reengaging the closure element at the bottom of the hatch where it is caught and held in sealing contact. Magnetic engagement between the closure and the bob is easily broken and the bob brought out of the hatch. The means to hold the hatch closure may be either magnetic or mechanical as desired. Additionally, a slotted hatch cover designed to pass a suspending tape to which the bob is attached for gauging, forms a tight closure against escaping volatile constituents and also supplies a datum plane against which to measure the tape indicia.

For a more complete understanding of the nature and scope of the invention in which the above-noted objects and others will be evident, reference is made to the following detailed description read in conjunction with the accompanying drawing in which.

In the following description reference will be made to magnets, magnetic material and non-magnetic material. Unless specifically set forth to the contrary these terms mean a permanent type of magnet; material which responds to or is attracted by a magnet and material which is not responsive to magnetic influence, respectively.

Figure 1:
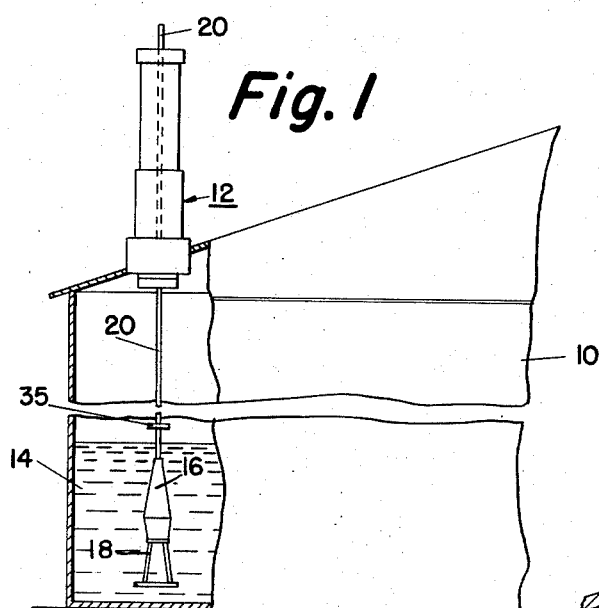
Figure 1 is an elevational view partly in section and broken to reduce the large dimensions showing the device in operating position.

Referring to the drawings by characters of reference and to Figure 1 in particular, the numeral 10 indicates a fixed roof storage tank on which is mounted the gauging device of this disclosure inclusively numbered 12. A body of liquid 14 such as is stored in the chemical and petroleum industries is shown filling the lower part of the storage tank 10 and immersing the plumb bob 16 or bob as it is better known and suspended hatch cover 18. A tape 20 usually marked for feet and inches of measurement attaches to the bob 16 and passes upwardly through the mounted elements of the device.

Figure 2:
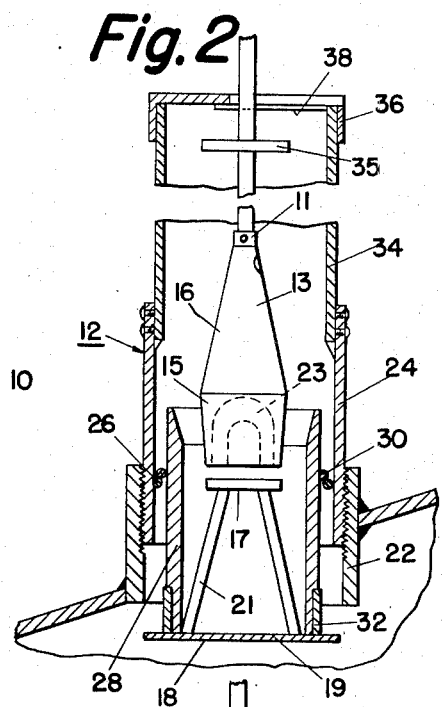
Figure 2 is an elevational view partly in section of the elements of the device in operating position.

By the mounted elements of the device are meant the permanently fixed parts associated with the storage tank to form the gauging hatch. Figure 2 shows one of the many forms this part of the apparatus may adopt, foreshortened to fit in the drawing space. A short section of pipe 22, or a standard flange, is let into the roof of the tank 10 at the chosen location for the gauging device. This can be of steel and permanently welded in place. Similarly threaded to engage pipe 22 a comparatively short piece of non-magnetic pipe 24, as of brass, for example, provides the housing on which the gauge is assembled and from which it is operated. A brass ring 26 is brazed around the full internal circumference of pipe 24 to form a seat for the closure elements.

Figure 4:
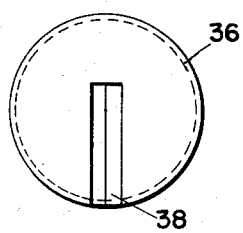
Figure 4 is a plan view of the cover element slotted to pass the gauging tape.

Inside non-magnetic pipe 24 a non-magnetic sleeve 28 is dropped until a peripherally brazed brass ring 30 wrapped externally around the sleeve, comes to rest on brass ring 26. As part of non-magnetic sleeve 28, fitted into the lower edge before it is dropped in place, a ring magnet 32 is positioned to exert its magnetic force in the area around the bottom thereof. Fitted into the top of non-magnetic pipe 24 an extension 34 of non-magnetic pipe increases the height of the gauge hatch to a dimension suitable for standing men to read tape 20. A cover 36, slotted with neoprene lips 38 (Figure 4) is fashioned to act as a cover for pipe 34, a seal for tape 20 and a datum to which the indicia on the tape are read. The device is thus described broadly and in detail regarding the relatively immovable members.

Figure 3:
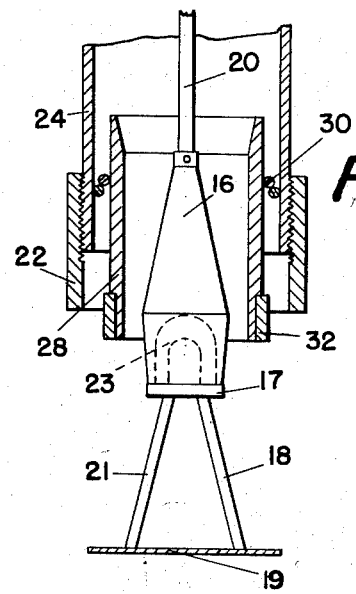
Figure 3 is a portion of Figure 2 showing the gauging operation.

The movable elements of the assembly have been numbered, namely, the bob 16, closure 18 and tape 20. In describing them in detail, the closure shown in closed position in Figure 2 and in open position in Figures 1 and 3, will be described first. Closure 18 is made from magnetic materials so as to operatively respond to both the ring magnet 32, attached to sleeve 28, and to the small horse shoe magnet in the bottom of bob 16, later to be described. Structurally it includes an upper plate 17 and a lower plate 19 held apart by sloping legs 21. As will be better understood after reading the description of the operation, the sloping legs assist in centering the closure 18 on completion of the gauging operation.

The bob 16 is also shaped to facilitate centering in the gauge hatch elements. From the drawing bob 16 can be easily imagined as being made of two right angle cones butted together and sloping away from each other. The upper portion 13 extends to form a connection 11 for tape 20. The lower portion 15 is adapted to house horse shoe magnet 23 in its base in such a way as to exert the magnetic influence on closure 18 which is fabricated from magnetically responsive material. Other means for creating a magnetized area in the lower portion of bob 16 are well known and may be substituted for the magnet construction if desired.

Tape 20 engages the top of bob 16 as at 11, and passes upwardly through cover 36 and neoprene lips, the tape to be held by the gauger. The indicia as noted above, are normally feet and inches and read upwardly from the bob. This is not requisite to this device, but forms an easier way to read liquid heights with apparatus of this type. A stop 35 is fastened on tape 20 to remove cover 36 after the closure is seated and before bob 16 strikes the cover. In this way the wetted portion of the tape is preserved as a measurement.

Figure 5:
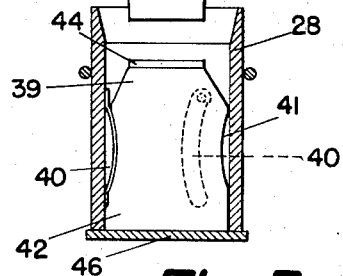
Figure 5 is an element of the device showing an alternate fastening arrangement.

Figure 5 shows an alternate form of closure which can be used with this device. In place of the ring magnet 32 of Figures 2 and 3, a mechanically engaging means such as flexible spring members 40 are spaced circumferentially around the sleeve 28. Three equi-spaced spring members 40 are sufficient to releasably secure the closure 42 which is shown in elevation except for its bottom plate 46.

As is evident from a consideration of Figure 5, closure 42 is very different in physical characteristics from the above-described closure 18, yet performs the same functions. Closure 42 is preferably made of magnetic material pressed to form a hollow member. Plates 44 and 46 form the upper and lower elements and are similar in shape and formation to plates 17 and 19 of closure 18. The body of closure 40 is conically shaped on top as at 39 and pinched at 41 in the area of the spring members 40 to provide a releasable grip thereon.

A gauging operation will be described to emphasize the flexibility and advantages of the described device. It will be evident that when properly seated, either the preferred or alternate closure members 18 or 42 will prevent volatile constituents from escaping through the gauge pipe assembly. At this time, bob 16 is withdrawn and becomes part of the portable equipment of the tank gauger. Cover 36 is placed on pipe 34 and prevents the weather elements from filling the device with snow, rain, or ice.

When the gauge is to be taken the gauger removes the cover, slips the cover lips on the tape above the stop 35 and lowers the bob into engagement with the magnetic closure. The weight of the bob and the limited relative diameter of the gauge pipes and bob direct the weight and open the closure. However, the magnetic field on the foot of the bob engages the closure and suspends it as indicated in Figure 2. The lower plate of the closure element on both forms of closures is of sufficient area to give a "sense" of contact or engaging with the liquid surface by an instant of flotation immediately before submersion. The tape is then lowered until a small portion of the part adjacent the top of the bob is wetted in the stored liquid and the intersection of the tape indicia with the top of cover 36 is read. The tape is pulled up, the closure moves into engagement with the sleeve either magnetic or mechanical and the bob lifted upwardly disengages the closure. Stop 35 lifts cover 36 preserving the wetted surface of the tape. This wetted measurement is deducted from the tape reading of the datum height (top of cover 36) and the depth of the liquid surface below the datum ascertained. Cover 36 is removed from the tape and placed on the top of the gauge pipe.

It will be evident to those versed in the art, that changes other than the alternate closure suggested here can be made without exercise of the inventive faculty. Rearrangement and substitution of elements are also possible and may be in some instances desirable. All such changes and substitutions, as well as use of equivalents, are contemplated by the inventor except as limited expressly in the accompanying claims.

I claim:

1. Gauge means for liquid storage vessels comprising in combination, a non-magnetic tube adapted to fit a gauging aperture in the storage vessel and provide a gauge datum support, a non-magnetic sleeve supported in said tube adjacent the gauging aperture in the storage vessel, a closure of magnetic material adapted to sealably engage the non-magnetic sleeve, means cooperating with the sleeve and the closure releasably holding them together in the closed position, a magnetized bob adapted to be lowered into the tube and through the sleeve to engage and support the closure, a gauging tape supporting the magnetized bob, and a cap slotted to pass the tape and cover the tube during the gauging operation.

2. The gauge means of claim 1 further characterized in that the means cooperating with the sleeve and the closure releasably holding them together in the closed position is a magnet inserted in the non-magnetic sleeve to engage the closure.

3. The gauge means of claim 1 further characterized in that the means cooperating with the sleeve and the closure releasably holding them together in the closed position is a plurality of spaced resilient members attached to the sleeve to releasably support the closure in the sleeve.

4. Gauge means for liquid storage vessels comprising a non-magnetic sleeve adapted to seat in a gauge opening of a storage vessel, a closure of magnetic material adapted to releasably engage the sleeve in sealing relationship when closed, and a tape-suspended plumb bob with magnetic means in the base thereof for passage through the sleeve to magnetically engage the closure in the gauging operation and return it to re-engagement with the sleeve on completion thereof.

References Cited in the file of this patent

UNITED STATES PATENTS

| | | |
|---|---|---|
| 2,208,603 | Scaramucci | July 23, 1940 |
| 2,779,045 | Harvey | Jan. 29, 1957 |